US010030783B2

(12) United States Patent
Onishi et al.

(10) Patent No.: US 10,030,783 B2
(45) Date of Patent: Jul. 24, 2018

(54) CHECK VALVE AND RECEPTACLE STRUCTURE

(71) Applicants: TOYOTA JIDOSHA KABUSHIKI KAISHA, Toyota-shi, Aichi-ken (JP); NITTO KOHKI CO., LTD., Ohta-ku, Tokyo (JP)

(72) Inventors: Hirofumi Onishi, Aichi-gun (JP); Masaaki Kondo, Owariasahi (JP); Akira Yamashita, Toyota (JP); Takuya Nishio, Ohta-ku (JP)

(73) Assignees: Toyota Jidosha Kabushiki Kaisha, Toyota-shi, Aichi-ken (JP); Nitto Kohki Co., Ltd., Ohta-ku, Tokyo (JP)

( * ) Notice: Subject to any disclaimer, the term of this patent is extended or adjusted under 35 U.S.C. 154(b) by 0 days.

(21) Appl. No.: 14/934,182

(22) Filed: Nov. 6, 2015

(65) Prior Publication Data

US 2016/0131273 A1   May 12, 2016

(30) Foreign Application Priority Data

Nov. 12, 2014   (JP) .................................. 2014-229862

(51) Int. Cl.
*F17C 13/04*    (2006.01)
*F16K 27/02*    (2006.01)
*F16K 15/06*    (2006.01)

(52) U.S. Cl.
CPC ........ *F16K 27/0209* (2013.01); *F16K 15/063* (2013.01); *F17C 13/04* (2013.01);
(Continued)

(58) Field of Classification Search
CPC .............. F16K 27/0209; F16K 15/063; Y10T 137/7934; Y10T 137/794; F17C 13/04; F17C 2205/0335; F17C 2221/012
See application file for complete search history.

(56) References Cited

U.S. PATENT DOCUMENTS 2,896,663 A * 7/1959 Mena .................... F16K 15/044
  137/539
2,943,639 A * 7/1960 Smith ................... F16K 15/063
  137/515.7

(Continued)

FOREIGN PATENT DOCUMENTS

CN      101796336 A      8/2010
JP      52-94228 U       7/1977
(Continued)

*Primary Examiner* — Craig Schneider
*Assistant Examiner* — Frederick D Soski
(74) *Attorney, Agent, or Firm* — Finnegan, Henderson, Farabow, Garrett & Dunner, LLP

(57) ABSTRACT

In order to reduce a pressure loss in a check valve and simplify a manufacturing process, a check valve (10) configured to be disposed in piping of fluid is provided, which includes a valve housing (31) including a valve element (52) and a valve seat (54) therein, a casing (20) that is configured to place the valve housing therein, in which a casing flow path (60) is provided between the casing and the valve housing to make a flow of the fluid in an axial direction of the valve housing. In the valve housing, a communicating hole (38) and sealing portion (34) are formed. The communicating hole that is formed through the valve housing in a thickness direction thereof introduces the fluid, which flows through between the valve element and the valve seat at the open position of the check valve, into the casing flow path. The sealing portion that is provided on an outer surface of the valve housing upstream of the communicating hole in a flow direction of the fluid in the casing flow path, is configured to come into contact with an inner surface of the casing to seal the casing flow path and position the valve housing in a radial direction perpendicular to the axial direction relative to the casing.

4 Claims, 6 Drawing Sheets

(52) U.S. Cl.
CPC ........... *F17C 2205/0335* (2013.01); *F17C 2221/012* (2013.01); *Y10T 137/794* (2015.04); *Y10T 137/7934* (2015.04)

(56) References Cited

U.S. PATENT DOCUMENTS

| | | | | |
|---|---|---|---|---|
| 5,113,900 | A * | 5/1992 | Gilbert | F16K 15/063 137/515.5 |
| 5,474,104 | A * | 12/1995 | Borland | B60K 15/04 137/351 |
| 6,039,073 | A * | 3/2000 | Messick | F16K 15/063 137/515.7 |
| 2006/0021659 | A1 * | 2/2006 | Andersson | F16K 15/063 137/515 |
| 2010/0206403 | A1 * | 8/2010 | Kuroyanagi | F16K 1/308 137/511 |
| 2010/0288961 | A1 | 11/2010 | Weh | |
| 2013/0099486 | A1 | 4/2013 | Weh et al. | |
| 2016/0018013 | A1 | 1/2016 | Nishio et al. | |

FOREIGN PATENT DOCUMENTS

| | | |
|---|---|---|
| JP | 61-191564 U | 11/1986 |
| JP | S63-180775 U1 | 11/1998 |
| JP | 2007-087766 | 4/2007 |
| JP | 4162571 | 10/2008 |
| JP | 2010-534815 | 11/2010 |
| JP | 2013-535621 | 9/2013 |
| JP | 2013-231507 | 11/2013 |
| WO | WO 2014/163131 A1 | 10/2014 |

* cited by examiner

CHECK VALVE AND RECEPTACLE STRUCTURE

CROSS REFERENCE TO RELATED APPLICATION

This application claims priority to Japanese Patent Application No. 2014-229862, filed on Nov. 12, 2014, the contents of all of which are incorporated herein by reference in their entirety.

BACKGROUND OF THE INVENTION

Field

The present invention relates to a check valve and a receptacle structure provided with the check valve.

Related Art

As a check valve for preventing a back flow of Hold, JP2013-535621A proposes a check valve in which a valve element pressed in a direction opposite from an original flow direction of fluid (closing direction), and a valve element supporting part which surrounds and supports the valve element so as to extend in axial direction of the valve element (moving direction of the valve element) are provided inside a casing, and a flow path through which the fluid flows in the axial direction described above is formed between the valve element supporting part and the casing. The structure in which the flow path through which the fluid flows in the axial direction is provided between the valve element supporting part and the casing is desirable because it is easy to reduce a pressure loss in the check valve.

However, when adopting the structure described above, it is necessary to provide a space for forming the flow path through which the fluid flows in the axial direction between the valve element supporting part and the casing, and to align the valve element supporting part in a radial direction which is perpendicular to the axial direction with respect to the casing. For example, it is necessary to form a groove which extends in the axial direction for forming the flow path described above in either one of an outer surface of the valve element supporting part and an inner surface of the casing, and align the valve element supporting part inside the casing by contacting the outer surface of the valve element supporting part with the inner surface of the casing at, locations other than the groove described above. In other words, it is necessary to form the particular structure for forming the flow path by cutting etc., thereby requiring a complicated manufacturing process. Therefore, it is desired to simplify the manufacturing process, while reducing the pressure loss in the check valve.

SUMMARY

The present invention is made in order to address the subject described above, and can be implemented in terms of the following aspects, (1) According to one aspect of the invention, there is provided a check valve configured to be disposed in piping of a fluid. The check valve comprises: a valve housing that is configured to place a valve element and a valve seat therein and a casing that is configured to place the valve housing therein and is formed separately from the valve housing, wherein a casing flow path is provided between the casing and the valve housing to make a flow of the fluid in an axial direction of the valve housing. The check valve is set to a closed position when the valve element comes into contact with the valve seat and is set to an open position when the valve element separates from the valve seat. The valve housing comprises: a communicating hole that is formed through the valve housing in a thickness direction thereof to introduce the fluid flowing through between the valve element and the valve seat at the open position of the check valve, into the casing flow path; and a sealing portion that is provided on an outer surface of the valve housing upstream of the communicating hole in a flow direction of the fluid in the casing flow path, the sealing portion being configured to come into contact with an inner surface of the casing to seal the casing flow path and position the valve housing in a radial direction perpendicular to the axial direction relative to the casing.

According to the check valve of this aspect, the sealing portion formed in the outer surface of the valve housing seals the casing flow path between the valve housing and the casing, and positions the valve housing in the radial direction perpendicular to the axial direction with respect to the casing. Therefore, the structure for positioning the valve housing within the casing and the structure for forming the flow path which leads the fluid in the axial direction on the outer surface of the valve housing can be simplified, thereby simplifying the entire structure of the check valve. Here, since the casing flow path through which the fluid passed through the communicating hole flows in the axial direction of the valve housing is formed between the casing and the valve housing, a pressure loss in the check valve can be reduced.

(2) In the check valve according to the above aspect, the casing may include a plurality of casing members that are integrated by fitting the casing members relative to each other in the axial direction. The sealing portion may be a protruded portion formed as a larger-diameter protrusion of the valve housing by expanding a diameter of a cross section perpendicular to the axial direction. The protruded portion may have a pair of tapered portions that are formed at both ends thereof in the axial direction, each of the tapered portions being tapered to have diameter decreasing in the axial direction toward a corresponding end of the protruded portion. The protruded portion may be placed between two adjacent casing members, such that each of the pair of tapered portions comes into contact with different one of the two casing members, so as to position the valve housing in the casing in the axial direction.

According to the check valve of this aspect, since the sealing operation of the casing flow path and the positioning operation of the valve housing in the radial direction can be performed simultaneously, the manufacturing process can be simplified. Note that, by pinching the protruded portion between the two adjacent casing members, not only the positioning in the radial direction but a positioning in the axial direction can also be simultaneously performed as the positioning of the valve housing with respect to the casing. Further, since the pair of tapered portions formed in the protruded portion contact the two adjacent casing members, respectively, it becomes easy to secure a space which serves as the casing flow path between the outer surface of the valve housing and the inner surface of the casing.

(3) In the check valve according to the above aspect, the casing and the valve housing may be made of metal. According to the check valve of this aspect, since the casing flow path can be metal/sealed, the durability of the sealing structure can be improved, compared with a case where the sealing is secured by a sealing member made of a resin or rubber.

(4) In the check valve according to the above aspect may further comprise a valve holder that is attached to the valve housing. The valve element and a spring that is arranged to press the valve element in a closing direction may be placed in a space formed by the valve holder and the valve housing.

According to the check valve of this aspect, an exposure of components of the check valve other than the surfaces of the casing and the valve housing to the casing flow path can be reduced. Therefore, a flow path resistance in the check valve can be reduced, thereby improving an effect of reducing the pressure less.

(5) In the check valve according to the above aspect may further comprise a filter that is configured to remove unrequired substance from the fluid flowing into the valve housing; a filter guide that is configured to have a filter mounting part to which the filter is attached and to be joined with the valve housing, such that the fluid passing through the filter is led to the valve housing; and a filter supporting portion that is configured to support respective ends of the filter at both, ends of the filter mounting part. Length of the filter in an inserting direction before being supported at the respective ends on the filter mounting part may be longer than length of the filter mounting part in the inserting direction. According to the check valve of this aspect, the perimeter of the filter can be sealed by compressing and deforming the filter.

(6) According to another aspect of the invention, there is provided a receptacle structure mounted to a housing of a device that includes a hydrogen tank placed therein, the receptacle structure having a filling port that forms an end structure of a flow path communicating with the hydrogen tank and being connected with a hydrogen discharging part of a hydrogen supply device to fill hydrogen into the hydrogen tank. The receptacle structure comprises the check valve in accordance with any one of (1) to (5), and an interposition member that is placed between the check valve and the housing of the device. The casing of the check valve is made of austenite stainless steel. The interposition member is made of a less noble metal than the austenite stainless steel. According to the receptacle structure of this aspect, since a corrosion of the interposition member is easier, a corrosion of the casing can be reduced. Therefore, a stress corrosion cracking of the casing made of austenite stainless steel under a high-stress and high-corrosive atmosphere can be prevented, and the durability can be improved.

The present invention can be implemented in any various forms other than described above, such as a method of manufacturing the check valve, and a movable body provided with a hydrogen tank and the check valve of the present invention. Further, the present invention may be applied to a check valve used in a flow path for compressed natural gas (CNG).

DESCRIPTION OF THE EMBODIMENTS

A. Entire Outline Structure

Figure 1:
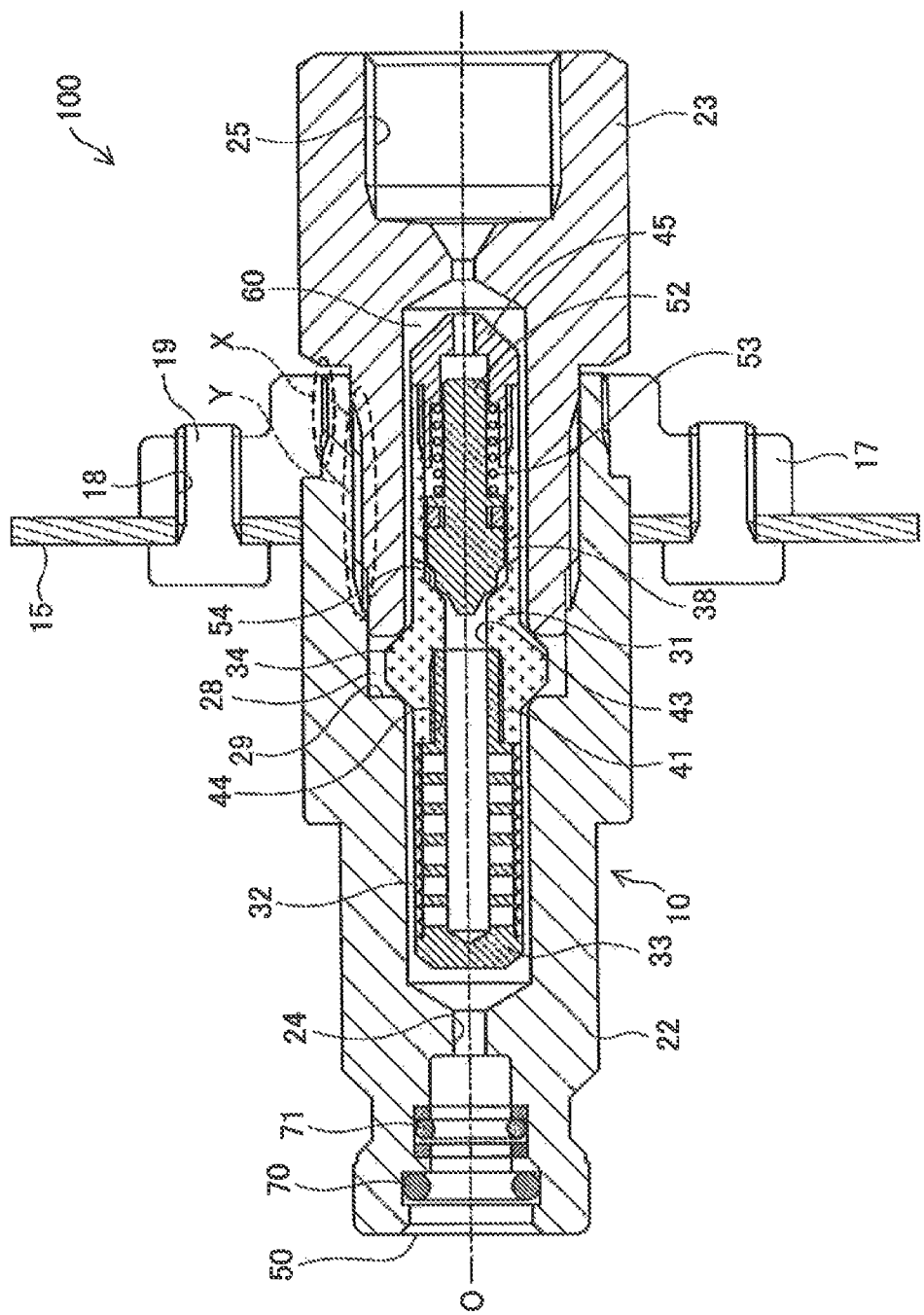
FIG. 1 is a cross-sectional view illustrating a receptacle structure.
Figure 2:
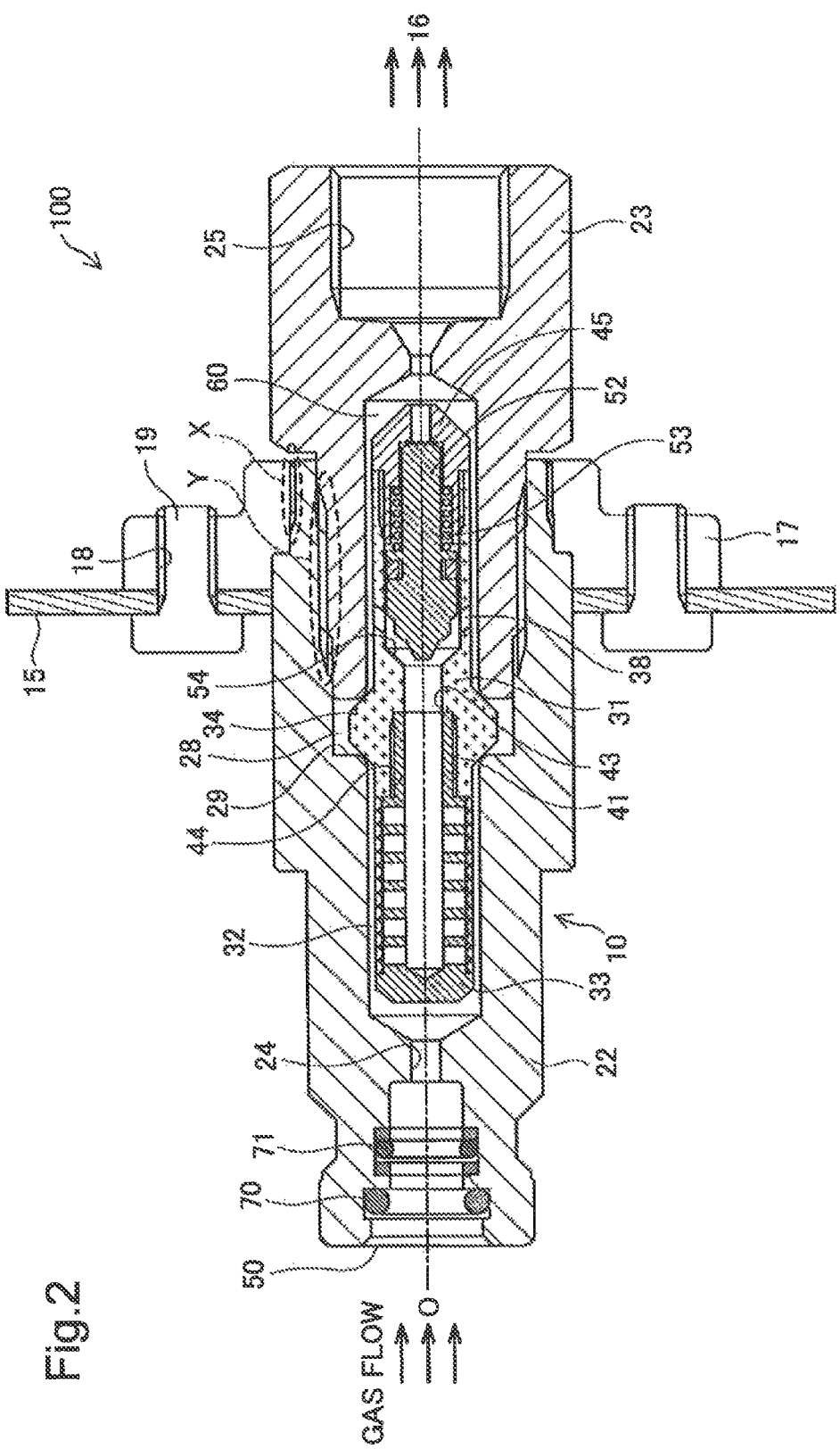
FIG. 2 is a cross-sectional view illustrating the receptacle structure.

FIGS. 1 and 2 are cross-sectional views illustrating a receptacle structure 100 provided with a check valve 10 as one embodiment according to the invention. FIGS. 1 and 2 indicate an axial center of the check valve 10 as a center axis O. In the following description, direction parallel to the center axis O is referred to as "axial direction." FIG. 1 illustrates a situation when the check valve 10 is closed, and FIG. 2 illustrates a situation when the check valve 10 is open.

The receptacle structure 100 of this embodiment is formed in a vehicle body 15 (may be referred to as "the housing") of a fuel cell vehicle, and is provided with a flange 17 in addition to the check valve 10. The fuel cell vehicle is provided with a hydrogen tank (not illustrated) for storage of hydrogen which is supplied to a fuel cell. The check valve 10 is disposed at an end of a piping 18 (see FIG. 2) which is provided so as to communicate with the hydrogen tank in order to fill up the hydrogen tank with hydrogen, and prevents a back flow of the hydrogen supplied from the hydrogen tank side.

Figure 3:
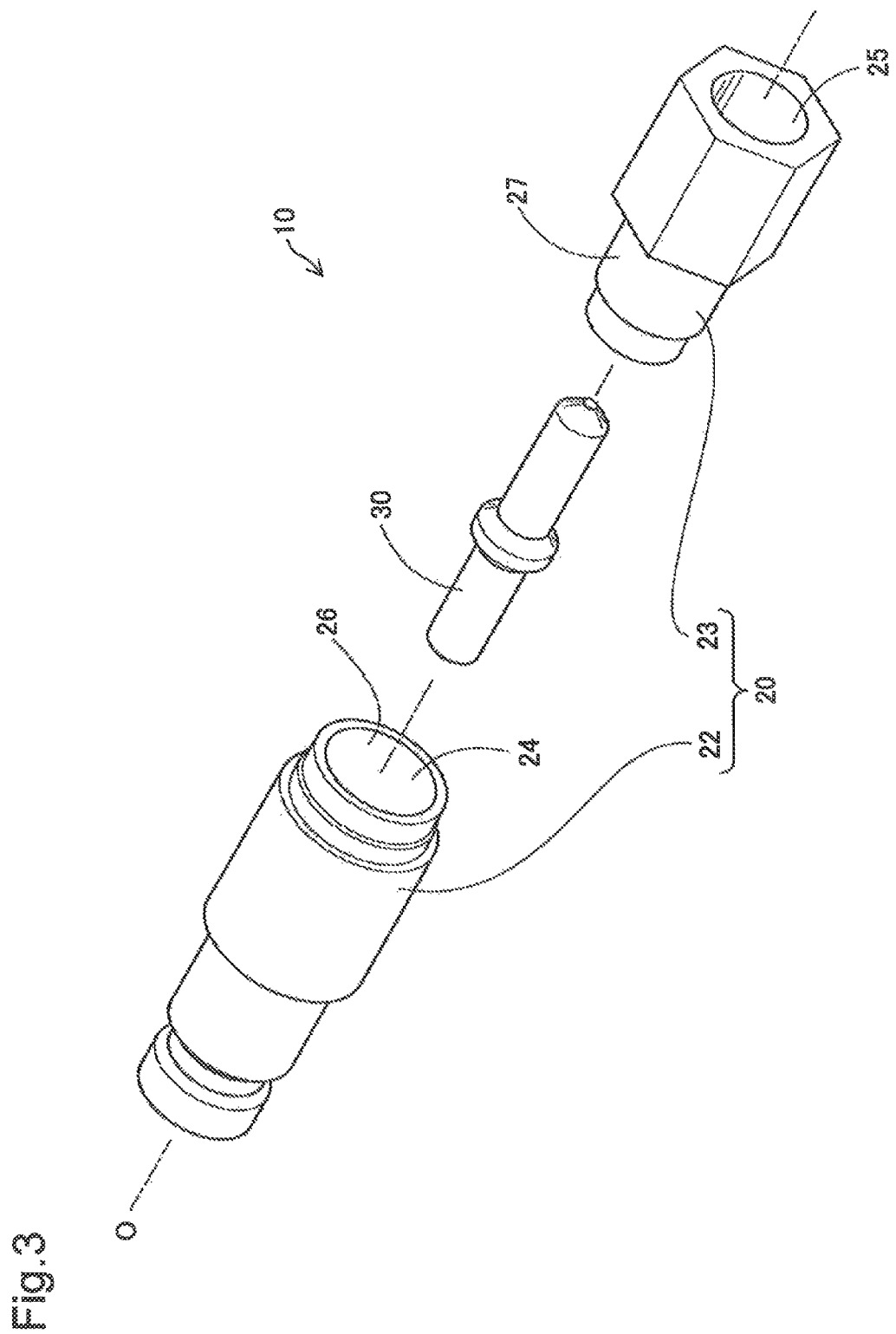
FIG. 3 is an exploded perspective view illustrating a structure of a check valve.

FIG. 3 is an exploded perspective view illustrating a structure of the check valve 10. As illustrated in FIG. 3, the check valve 10 includes a first casing member 22, a second casing member 23, and a check valve subassembly 30 (hereinafter, simply referred to as "the subassembly 30"). The first casing member 22 and the second casing member 23 are cylindrical members which are provided with through-holes 24 and 25 extending in the axial direction of the check valve 10, respectively. In the fuel cell vehicle, the first casing member 22 is disposed so as to project outwardly from the vehicle body 15, and the second casing member 23 is disposed so as to project inwardly from the vehicle body 15 (see the FIGS. 1 and 2). In the following description, as for the check valve 10, an outward axial direction from the vehicle body is referred to as "a tip-end side," and an inward axial direction from the vehicle body is referred to as "a rear-end side."

A female threaded portion 26 is formed in an inner surface on a rear-end side of the first, casing member 22. A male threaded portion 27 is formed in an outer surface on a tip-end side of the second casing member 23. The check valve 10 is formed by inserting the subassembly 30 in the through-holes 24 and 25 provided in the first casing member 22 and the second casing member 23, and fitting the male threaded portion 27 into the female threaded portion 26. The first casing member 22 and the second casing member 23 are integrated by such fitting to constitute a casing 20.

B. Structure of Subassembly

Figure 4:
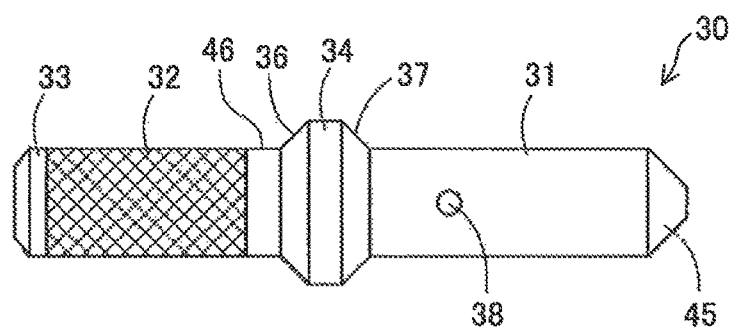
FIG. 4 is a view illustrating an appearance of a subassembly.
Figure 5:
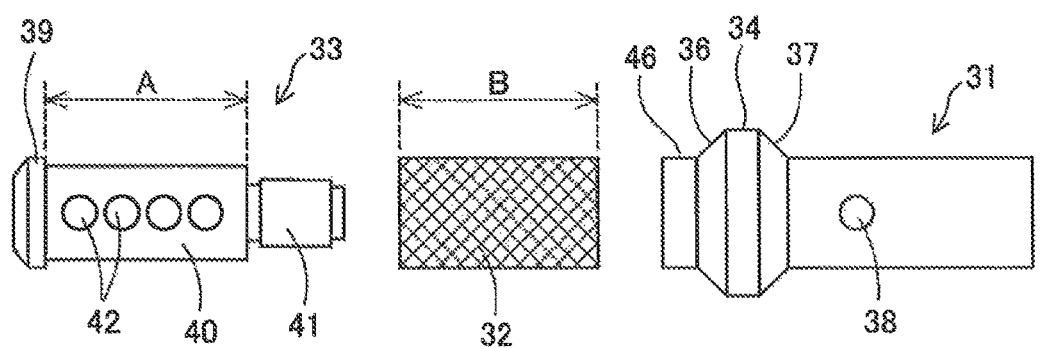
FIG. 5 is a view illustrating a situation in which a part of the subassembly is disassembled.

FIG. 4 is a view illustrating an appearance of the subassembly 30 seen in a direction perpendicular to the center axis O. FIG. 5 is a view illustrating a situation in which a part of the subassembly 30 is disassembled. As illustrated in FIGS. 4 and 5, the subassembly 30 includes a valve housing 31, a filter 32, a filter guide 33, and a valve holder 45. Each of the valve housing 31, the filter 32, and the filter guide 33 is a cylindrical member having a substantially circular shape in a cross section perpendicular to the axial direction (hereinafter, also referred to as "the transverse section") and having a through-hole extending in the axial direction.

The valve housing 31 includes a valve element and a valve seat of the check valve 10 therein, and the valve holder 45 which supports the valve element is disposed in a rear end portion of the valve housing 31 (see FIG. 4). A protruded portion 34, which protrudes in radially outward directions of the transverse section, i.e., which is formed by partially enlarging a diameter of the transverse section, is formed in a tip-end portion of the valve housing 31. At a tip-end side end portion and a rear-end side end portion of the protruded portion 34, tapered portions 36 and 37 which are gradually reduced in diameter toward the ends of the protruded portion in the axial direction, are formed, respectively. A tip-end supporting portion 46 which has a substantially constant diameter in the transverse section is formed on the tip-end side of the tapered portion 36. Further, communicating holes 38 which lead hydrogen passed through the flow path formed between the valve element and valve seat described above to outside the valve housing 31 are formed in the valve housing 31. An internal structure of the valve housing 31 will be described in detail later.

The filter 32 is a porous member for removing unrequired substances from hydrogen which passes through the check valve 10, and is formed in a cylindrical shape.

The filter guide 33 includes an insert portion 40, a filter end support portion 39, and a male threaded portion 41. The insert portion 40 is inserted into the through-hole of the filter 32, and supports the filter 32. Thus, since the filter 32 is supported by the filter guide 33, the durability of the filter can be secured also when hydrogen gas flows at a large flow rate. In this embodiment, the insert portion 40 corresponds to the "filter mounting part" in SUMMARY.

The a filter end support portion 39 is formed at the tip-end side of the insert portion 40 into a flange shape which has a larger diameter in a transverse section than the insert portion 40, and supports a tip-end side end portion of the filter 32 when the insert portion 40 is inserted into the filter 32. The insert portion 40 has communicating holes 42 formed through the insert portion 40 in its thickness direction to introduce hydrogen passing through the filter 32 into a cavity of the filter guide 33. In this embodiment, a plurality of communicating holes 42 are arrayed in the axial direction. A situation in which hydrogen flows through the inside of the check valve 10 will be described in detail later.

When assembling the subassembly 30, the filter guide 33 is inserted into the filter 32 from the rear-end side of the filter guide 33, and the filter 32 is disposed over the insert portion 40. Then, the male threaded portion 41 in a rear end portion of the filter guide 33 is inserted into the tip-end portion of the valve housing 31 in the axial direction. Note that a female threaded portion (not illustrated) corresponding to the male threaded portion 41 is formed in an inner surface in the tip-end portion of the valve housing 31.

Here, a length A (see FIG. 5) of the insert portion 40 in the axial direction is formed shorter than a length B (see FIG. 5) of the filter 32 in the axial direction before the subassembly 30 is assembled. Thus, when the subassembly 30 is assembled, the filter 32 is compressed in the axial direction between the filter end support portion 39 of the filter guide 33 and the tip-end supporting portion 46 provided at a tip-end of the valve housing 31. In this embodiment, the tip-end supporting portion 46 provided at the tip-end of the valve housing 31 and the filter end support portion 39 of the filter guide 33 correspond to a "filter supporting portion" in SUMMARY. Thus, since the filter 32 is held in the compressed state, sealing at a boundary between the filter 32 and the filter end support portion 39 and sealing a boundary between the filter 32 and the tip-end supporting portion 46 can be secured (a hydrogen flow bypassing the filter 32 can be prevented). Note that when assembling the subassembly 30, a valve element and a spring which will be described later are further disposed in the valve housing 31, and the valve holder 45 is fixed to the rear end portion of the valve housing 31, C. Structure of Check Valve Returning to FIGS. 1 and 2, a casing flow path 60 which is a flow path of hydrogen is formed in the cheek valve 10 by a space formed between the casing 20 comprised of the first casing member 22 and the second casing member 23, and the subassembly 30. A recessed portion 28 is formed in the inner surface of the casing 20 at a boundary portion between the first casing member 22 and the second casing member 23. The recessed portion 28 is a structure which forms the space between a stepped portion 29 formed in an inner surface of the first casing member 22 and a tip-end of the second casing member 23, and is formed by fitting the second, casing member 23 into the first casing member 22. In this embodiment, the protruded portion 34 formed in the subassembly 30 engages with the recessed portion 28 described above. As illustrated in FIG. 3, such an engagement of the protruded portion 34 with the recessed portion 28 is performed by fitting the first casing member 22 onto the second casing member 23, while placing the subassembly 30 between the first casing member 22 and the second casing member 23.

In the recessed portion 28, a flow path of hydrogen formed inside the casing 20 on the tip-end side from the protruded portion 34 and a flow path (casing flow path 60) of hydrogen formed on the rear-end side from the protruded portion 34 are sealed by engaging the protruded portion 34 with the inner surface of the casing 20. In other words, the female threaded portion 26 of the first casing member 22 is fitted onto the male threaded portion 27 of the second casing member 23, while placing the subassembly 30 inside, and each of the tapered portions 36 and 37 is then tightly contacted with the inner surface of the casing 20, thereby obtaining the sealing of the flow paths of hydrogen described above.

Further, the valve housing 3! is positioned in the radial direction perpendicular to the axial direction with respect to the casing 20, by engaging the protruded portion 34 with the inner surface of the casing 20 in the recessed portion 28 as described above, thereby positioning the valve housing 31 in the axial direction with respect to the casing 20. In this embodiment, the protruded portion 34 corresponds to a "sealing portion" in SUMMARY.

In this embodiment, the protruded portion 34 of the subassembly 30 engages with the recessed portion 28 at both of the tapered portions 36 and 37. By having such a structure, it becomes easy to secure the space which forms the casing flow path 60 between the side face of the subassembly 30 and the inner surface of the casing 20. When the tapered portions 36 and 37 are not formed in the protruded portion 34, but the protruded portion 34 is formed with steps perpendicular to the axial direction, the protruded portion 34 may partially enter deeper into the recessed portion 28, and the space used as the flow path of hydrogen may partially become narrower. In this embodiment, since the tapered portions 36 and 37 are formed in the protruded portion 34, the radial positioning of the valve housing 31 with respect to the casing 20 can be performed appropriately, thereby preventing the space which forms the casing flow path 60 being partially narrower. Note that the tapered angles of the tapered portions 36 and 37 may differ from each other. Further, the diameters of the valve housing 31 in the transverse section, i.e., the diameter of the tapered portion 36 in the transverse section at a position which comes into contact with the first casing member 22, and the diameter of the tapered portion 37 in the transverse section at a position which comes into contact with the second casing member 23 may be different from each, other.

As illustrated in FIGS. 1 and 2, a through-hole 43 extending in the axial direction is formed inside the valve housing 31. A female threaded portion 44 for threadedly engaging with the male threaded portion 41 of the filter guide 33 is formed in a tip-end portion of the through-hole 43, and a valve seat 54 is formed on the rear-end side of the female threaded portion 44 so that a diameter of the through-hole 43 in the transverse section gradually increases toward the rear-end side.

Figure 6:
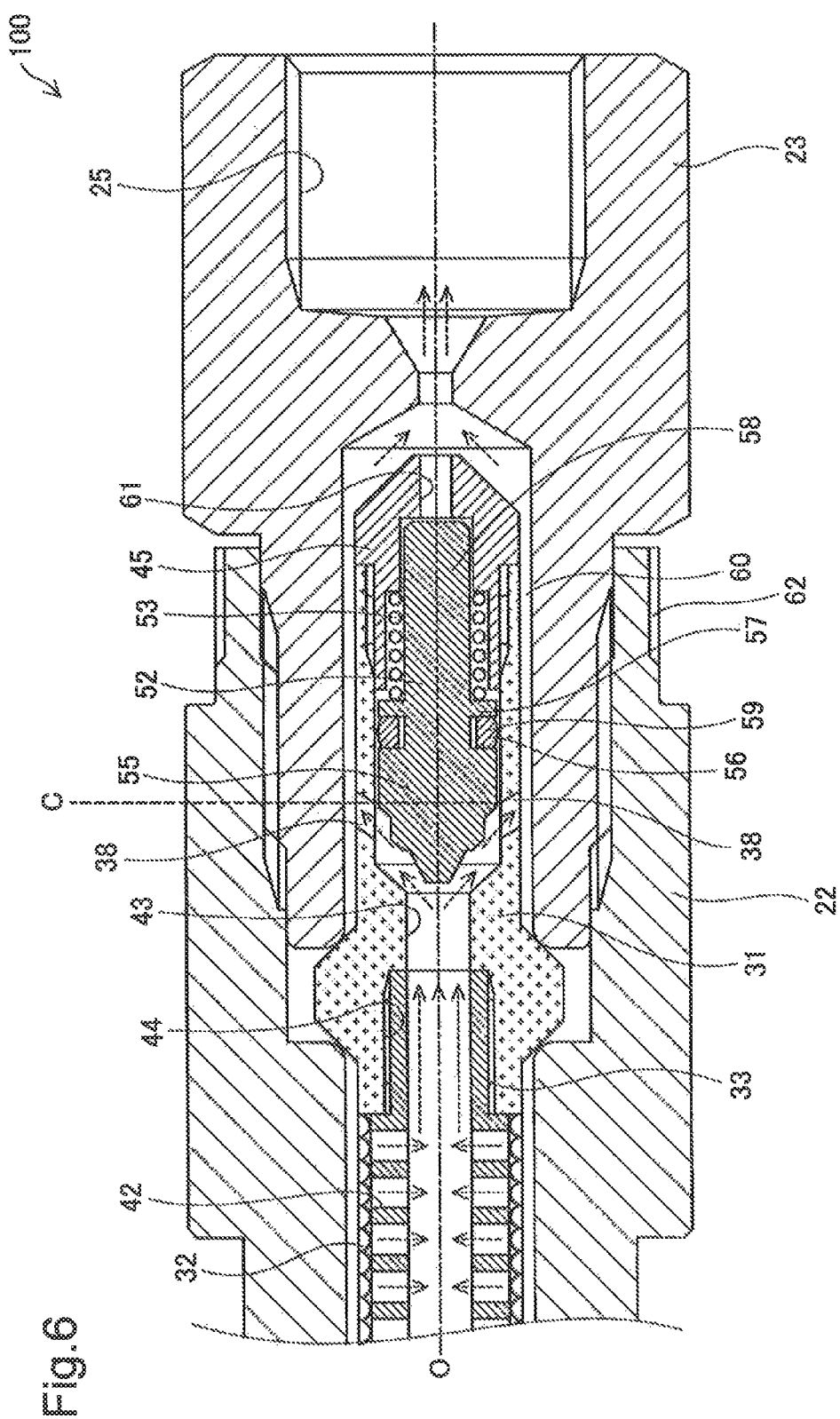
FIG. 6 is an enlarged view illustrating a part according to an internal structure of a value housing.

FIG. 6 is an enlarged view illustrating a part according to the internal structure of the valve housing 31 in FIG. 2. As described already, the valve holder 45 is joined to the rear end of the valve housing 31, and the valve element 52 is disposed so as to be slidable in the axial direction in a space formed inside of the valve housing 31 and the valve holder 45. Further, the spring 53 is disposed in a space formed between the valve element 52 and the valve holder 45. A valve head portion 55 is formed in a tip-end portion of the valve element 52, and a tip-end portion of the valve head portion 55 is formed in a substantially conical shape of which a diameter is reduced toward the tip-end side. An annular recessed portion 56 which has an annular groove structure formed along the perimeter of the valve element 52 is formed in an outer surface of the valve element 52 on the rear-end side from the valve head portion 55. Further, an annular protruded portion 57 which has an annular convex structure formed along the perimeter of the valve element 52 is formed in the outer surface of the valve element 52 on the rear-end side from the annular recessed portion 56. The rear-end side of the valve element 52 from the annular protruded portion 57 is a bar-like portion 58 of which a diameter in the transverse section is substantially constant and is smaller than that of the annular protruded portion 57.

In this embodiment, the spring 53 is a coil spring and is disposed in a space defined by the valve housing 31, the valve holder 45, and the valve element 52 to arrange the axial direction along its stretch compression direction. The bar-like portion 58 of the valve element 52 is inserted into the spring 53, an end portion of the spring 53 on the rear end side is in contact with the valve holder 45, and an end portion of the spring 53 on the tip-end side is in contact with the annular protruded portion 57 of the valve element 52. Thereby, the spring 53 presses the valve element 52 in a direction in which the tip-end portion of the valve element 52 comes into contact with the valve seat 54 (valve closing direction).

The valve element 52 (the valve head portion 55 and the annular protruded portion 57) is formed so that a slight clearance is generated between the valve element 52 and the inner surface of the valve housing 31. An annular sliding resistance applying member 59 is disposed in the annular recessed portion 56 formed in the valve element 52. The sliding resistance applying member 59 comes into contact with the inner surface of the valve housing 31, and produces a friction resistance between the sliding resistance applying member 59 and the inner surface of the valve housing 31 when the valve element 52 slides in the axial direction.

In this embodiment, the first casing member 22, the second casing member 23, the valve housing 31, the filter 32, the filter guide 33, and the valve holder 45 are made of metal(s). The metal(s) which constitute the members described above are desirable to be austenite stainless steel in consideration of an anti-hydrogen embrittlement. For example, the members described above may also be made of other kinds of alloys, such as stainless steel and/or carbon steel, and may be coated, if needed. The valve element 52 may be made of, for example, a resin or rubber.

D. Mode of Gas Flow in Check Valve

Other than when the hydrogen tank mounted on the vehicle is filled up with hydrogen, the check valve 10 is closed (see FIG. 1) because the tip-end portion of the valve element 52 pressed by the spring 53 comes into contact with the valve seat 54. When filling up the hydrogen tank with hydrogen, a high-pressure hydrogen gas is supplied into the through-hole 24 from the tip-end side of the first casing member 22 to move the valve element 52 to the rear-end side in the axial direction, thereby opening the check valve 10 as illustrated in FIGS. 2 and 6. In FIG. 8, the situation in which hydrogen flows is illustrated, by dashed-line arrows. The hydrogen gas supplied from the tip-end side of the first casing member 22 passes through the filter 32, and then flows into the filter guide 33 via the communicating holes 42 (see FIG. 5 and FIG. 6) of the filter guide 33. The hydrogen gas flowed into the filter guide 33 flow's to the rear end side in the axial direction, and then passes through the gap between the tip-end portion of the valve element 52 and the valve seat 54. Then, the hydrogen gas flows into the casing flow path 60 via the communicating holes 38 formed in the valve housing 31, and then flows to the rear-end side in the axial direction. The hydrogen gas reached the rear end of the valve housing 31 is discharged from a rear end portion of the through-hole 25 formed so as to penetrate the second casing member 23 in the axial direction, and is led to the piping 16 which communicates with the hydrogen tank (see FIG. 2).

The size and number of the communicating holes 38 which are formed in the valve housing 31 may be suitably set so that a pressure loss resulting from the communicating holes 38 falls within a tolerance range in consideration of the maximum flow rate of hydrogen gas which flows through the check valve 10, The projected position (on the center axis O, position C shown in FIG. 6) of a rear end point of the opening of each communicating hole 38 at the inner surface of the valve housing 31 is desirably identical with or on the rear side of the projected position (on the center axis O) of a front end point of the contact area where the valve head portion 55 is in contact with the inner surface of the valve housing 31 (across a small clearance). By having such a structure, when hydrogen gas flows outside the valve housing 31 from the communicating holes 38 at the time of filling of hydrogen gas, a generation of turbulence resulting from a bent flow path due to the contact of hydrogen gas with the inner surface of the valve housing 31 can be reduced, thereby reducing a flow sound (noise) caused by the turbulence. As a result, discomfort and uneasy feelings which may be caused by the flow sound transmitted info a vehicle cabin through the piping can be reduced. Further, it becomes possible to shorten a filling time by reducing the pressure loss at the time of hydrogen filling.

Here, the communicating holes 38 formed in the valve housing 31 may also penetrate the valve housing 31 perpendicularly in the thickness direction, and may be formed in the valve housing 31 at an angle inclined with respect to the thickness direction thereof. For example, when the communicating holes 38 are formed in the thickness direction of the valve housing 31 so as to incline in the same direction as the inclination of the tip-end portion of the valve element 52, the effect of reducing the pressure loss when hydrogen outflows from the inside of the subassembly 30 via the communicating holes 38 can be improved, Note that in this embodiment, a rear end portion of the valve holder 45 is formed in a substantially conical shape of which a diameter is reduced toward a rear end thereof. Thereby, a pressure loss when hydrogen flowed along the outer surface of the valve housing 31 is further led to downstream at the rear end of the valve housing 31 can be reduced. Further, in this embodiment, a discharge port 61 which penetrates the valve holder 45 in the axial direction is formed in the rear end portion of the valve bolder 45. It becomes possible to discharge foreign matters via the discharge port 61 by forming such an discharge port 61 also when the foreign matters enters into a gap between the valve housing 31 and the valve holder 45, and the valve element 52.

E. Receptacle Structure

As illustrated in FIGS. 1 and 2, the check valve 10 is attached to the vehicle body 15 via the flange 17 to constitute the receptacle structure 100 for connecting with a hydrogen supply device. The flange 17 has bolt holes 18 for attaching the flange 17 to the vehicle body with bolts 19. In this embodiment, the flange 17 corresponds to an "interposition member" in SUMMARY. Note that although the flange 17 of this embodiment is an annular member, the flange 17 may be a member having any other shapes.

The assembly of the first casing member 22, the second casing member 23, and the subassembly 30 is described above with reference to FIG. 3. In attachment of the receptacle structure 100 to the vehicle body, the subassembly 30 is first placed inside the first casing member 22. Next, the flange 17 is placed onto the rear end portion of the first casing member 22, and the flange 17 is fastened to the first casing member 22. Specifically, an outer surface of the rear end portion of the first casing member 22 is threaded to form a male threaded portion 62 (see FIG. 6), and an inner surface of the flange 17 is threaded to form a female threaded portion. The flange 17 is threadedly engaged with the first casing member 22 to be fixed thereto. In FIGS. 1 and 2, the fastened part of the first casing member 22 and the flange 17 is illustrated as a fastening portion X.

Next, the tip-end portion of the second casing member 23 is inserted into the first casing member 22 via the flange 17 from the rear end side in the axial direction. Then, the female threaded portion 26 formed in the first casing member 22 is threadedly engaged with the male threaded portion 27 formed in the second casing member 23, as described already (see FIG. 3). In FIGS. 1 and 2, the part at which the first casing member 22 is threadedly engaged with the second casing member 23 is illustrated as a fastening portion Y. Thereby, the receptacle structure 100 is completed. Then, inside the vehicle body 15, the receptacle structure 100 is fastened to the vehicle body 15 by threadedly engaging the bolts 19 with the bolt holes 18 of the flange 17, and thereby attachment of the receptacle structure 100 to the vehicle body is completed. Instead of mounting to the vehicle body 15 after completion of the receptacle structure 100 as described above, a modification may assemble the components of the receptacle structure 100 on the vehicle body 15, simultaneously with mounting to the vehicle body 15.

Note that in this embodiment, the fastening portion X comprised of the male threaded portion 62 and the female threaded portion, and the fastening portion Y comprised of the male threaded portion 27 and the female threaded portion 26 are reversed in thread direction from each other. By having such a structure, for example, when connecting a hydrogen discharging part (filling nozzle) of the hydrogen supply device to the receptacle structure 100, loosening of the fastening portions X and Y can be prevented even if a rotational or twisting force about the center axis O is applied to the receptacle structure 100. In other words, even if a torque in a direction in which one of the fastening portion X or Y is loosen is applied, the torque can be stopped by a reaction force produced in the other fastening portion, thereby preventing the loosening of the fastening portions.

In this embodiment, the flange 17 is made of a metallic material similar to the first casing member 22 and the second casing member 23; however, the flange 17 is particularly made of a less noble material (lower normal electrode potential) than those of the first casing member 22 and the second casing member 23. In other words, the flange 17 is made of a material which is faster in oxidizing speed than the first casing member 22 and the second casing member 23. For example, when the first casing member 22 and the second casing member 23 are made of austenite stainless steel, the flange 17 is made of carbon steel (or may additionally be the carbon steel galvanized to increase the potential difference between the flange and the casing members). By having such a structure, the flange 17 is more easily corroded than the casing members, thereby preventing the corrosion of the casing members 22, and 23 (i.e., the casing 20).

Like this embodiment, if the receptacle structure 100 is used for a piping element of hydrogen, the metal members which constitute the check valve 10 are made of austenite stainless steel, thereby improving the anti-hydrogen embrittlement. However, it is known that the austenite stainless steel is easy to crack by corrosions. Like this embodiment, for example, in order to achieve the sufficient sealing in the protruded portion 34 of the receptacle structure 100 used for filling of the high-pressure hydrogen, it is necessary to obtain a high axial thrust caused by a high fastening force, for example, at the fitting part (threadedly-engaging part) between the first casing member 22 and the second casing member 23. Therefore, when the austenite stainless steel is used as the material of the casing 20, it becomes particularly important to prevent the corrosion cracking. In this embodiment, since the flange 17 is configured to be stimulated in corrosion as described above, while preventing the corrosion of the casing 20, a stress corrosion cracking of the casing 20 which is a pressure-resistant member under a high-stress and high-corrosive atmosphere can be prevented, and the durability can be improved.

In the receptacle structure 100, an opening 50 of the through-hole 24 is formed in a tip-end portion of the first casing member 22. In this modification, the opening 50 corresponds to a "filling port" in SUMMARY. In the tip-end portion of the first casing member 22, O-rings 70 and 71 are disposed in an inner surface of the through-hole 24. The O-rings 70 and 71 seal between the filling nozzle and the internal flow path of the check valve 10 when the hydrogen discharging part (filling nozzle) of the hydrogen supply device is connected with the tip-end portion of the first casing member 22.

According to the receptacle structure 100 provided with the check valve 10 of this embodiment configured as described above, the protruded portion 34 formed in the outer surface of the valve housing 31 seals the casing flow path 60 between the valve housing 31 and the casing 20, and the subassembly 30 (valve housing 31) is positioned, in the radial direction perpendicular to the axial direction with respect to the casing 20. Thus, the structure for positioning the valve housing 31 inside the casing 20 and the structure for forming the flow path winch leads hydrogen in the axial direction on the outer surface of the valve housing 31 can be simplified, thereby simplifying the entire structure of the check valve 10. Thereby the manufacturing cost of the check valve 10 can also be reduced.

The operations of the seal and positioning as described above are performed by pinching the protruded portion 34 within the recessed portion 28 formed at the boundary between the first casing member 22 and the second casing member 23 when assembling the first casing member 22 and the second casing member 23 in order to assemble the check valve 10. Thus, since the sealing operation of the casing flow path 60 and the positioning operation of the valve housing 31 in the radial direction can be performed simultaneously, the manufacturing process can be simplified. Note that in this embodiment, since the protruded portion 34 is pinched between the first casing member 22 and the second casing member 23, a positioning of the subassembly 30 (valve housing 31) in the axial direction with respect to the casing 20 can also be performed simultaneously with the positioning in the radial direction.

No components of the check valve 10 other than the surfaces of the easing 20 and the valve housing 31 are exposed to the casing flow path 60 formed between the casing 20 and the valve housing 31 by positioning the valve housing 31 in the radial direction by means of the protruded portion 34 as described above. This reduces the flow path resistance in the check valve 10, thereby reducing the pressure loss in the check valve 10. Reducing the pressure loss of the check valve 10 advantageously shortens the filling time to fill hydrogen into the hydrogen tank via the check valve 10 at high speed.

Particularly, in this embodiment, the protruded portion 34 provided to seal the casing flow path 60 formed between the valve housing 31 and the casing 20 is exposed on the outer surface of the valve housing 31. This does not require any additional member for sealing the flow path and simplifies the configuration of the check valve 10. Further, in this embodiment, since the recessed portion 28 of the inner surface of the metal casing 20 comes into contact with the protruded portion 34 of the metal valve housing 31, the seal of the casing flow path 60 can be configured to be a metal seal. Therefore, the durability of the sealing structure can be improved, compared with a case where the sealing is secured by a sealing member made of a resin or rubber.

Further, according to this embodiment, since the valve element 52 and the valve seat 54 of the check valve 10 are placed in the subassembly 30, it is possible to inspect performances of the filter 32 and the check valve based on the state of the subassembly 30 before the check valve 10 is assembled. As a result, since it is possible to eliminate defected products before the check valve 10 is assembled, the productivity of the device (fuel cell vehicle) to which the check valve 10 is to be mounted improves.

For example, when the valve element is directly assembled inside the casing without placing it in the subassembly 30, or when a valve seat is formed as a structure of the inner surface of the casing, the inspection described above may not be able to be performed unless the check valve is assembled. In such a case, when a defect is found in the inspection, it is necessary to disassemble the check valve which has been once assembled, replace the defected component(s), reassemble the check valve, and then again inspect the reassembled check valve. This complicates the manufacturing process and increases the manufacturing cost. Further, when disassembling the check valve which has been once assembled, and reassembling the check valve, the casing may be damaged to degrade the product values. Such inconveniences can be reduced by this embodiment.

In the check valve 10 of this embodiment, since any defects can be addressed by replacing only the subassembly 30 with a new subassembly in a maintenance after use of the cheek valve 10, the workability can be improved and the maintenance cost can be reduced. In other words, the complicated process of entirely disassembling the check valve, replacing necessary component(s), and reassembling each disassembled component while preventing foreign matters etc. from entering into the components, becomes unnecessary.

F. Modifications

Modification 1 (Modification of Sealing Portion)

Although the casing flow path 60 formed between the casing 20 and the subassembly 30 is metal-sealed in the above embodiment described using the protruded portion 34, different structures may also be adopted. For example, the seal described above may be comprised of an O-ring or a resin seal which are provided separately from the valve housing 31.

Figure 7:
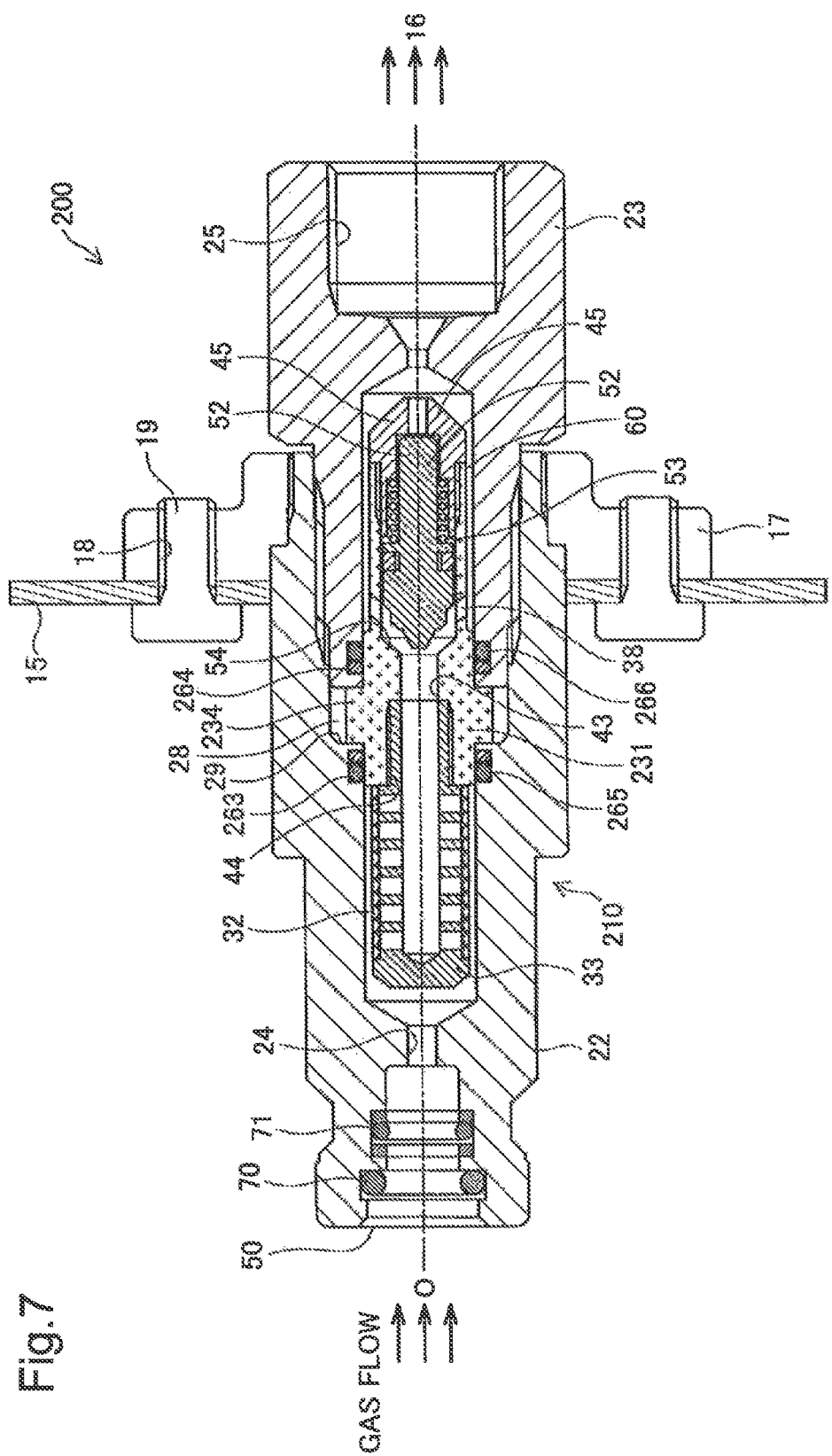
FIG. 7 is a cross-sectional view illustrating a receptacle structure.

FIG. 7 is a cross-sectional view illustrating a receptacle structure 200 provided with a check valve 210 of this modification. In FIG. 7, a state where the check valve is open, similar to FIG. 2, is illustrated. In this modification, the same reference numerals are given to parts which are common to the parts of the receptacle structure 100 described in the embodiment, and detailed description thereof is thus omitted.

A protruded portion 234 is formed in an outer surface of a valve housing 231 provided to the check valve 210, instead of the protruded portion 34. The protruded portion 234 is pinched, similar to the protruded portion 34, inside the recessed portion 28 formed at the boundary between, the first casing member 22 and the second casing member 23 within the casing 20 to position the valve housing 231 in the axial direction with respect to the casing 20. Note that the protruded portion 234 is not provided with the tapered portions 36 and 37, unlike the protruded portion 34. Thus, in the check valve 210, the protruded portion 234 does not function to position the valve housing 231 in the direction perpendicular to the axial direction with respect to the casing 20.

Further, near the part where the recessed portion 28 is formed, a recessed portion 263 which is an annular recessed portion is formed in an inner surface of the first casing member 22, and a recessed portion 264 which is an annular recessed portion is formed in an inner surface of the second casing member 23. O-rings 265 and 266 are fitted into the recessed portions 263 and 264, respectively. The O-rings 265 and 266 are in contact with an outer surface of the valve housing 231. Thereby, the O-ring 265 seals a flow path of hydrogen formed between the casing 20 (first casing member 22) and the subassembly 30 (filter 82). Further, the O-ring 266 seals the casing flow path 60 formed between the casing 20 (second casing member 23) and the subassembly 30 (valve housing 231).

Further, the O-rings 285 and 266 come into contact with an inner surface of the casing 20 and an outer surface of the subassembly 30 to position the valve housing 31 in the radial direction perpendicular to the axial direction with respect to the casing 20. In this modification, the O-ring 266 corresponds to the "sealing portion" in SUMMARY. Also in such a case, the sealing of the hydrogen flow path in the casing 20 and the positioning of the valve housing 231 in the radial direction can easily be performed when assembling the check valve 210, thereby acquiring the same effects as those of the embodiment.

Modification 2 (Modification of Subassembly)

Although the filter 32 is compressed and held by the a filter end support portion 39 of the filter guide 33 and the tip-end supporting portion 46 of the valve housing 31 in the embodiment, different structures may also be adopted. For example an end portion of the filter 32 may be fixed to the filter guide 33 by welding, without providing at least one of the a filter end support portion 39 having the flange-shaped structure and the tip-end supporting portion 46 for holding the filter 32. By having such a structure, similar effects of reducing the hydrogen flow which bypasses the filter 32 can also be acquired. Note that, when the filter 32 is pinched and held from both sides similar to the embodiment, it is desirable because particular processes, such as welding, become unnecessary, and only the filter 32 can be replaced at the time of a maintenance, without replacing the filter guide 33. When both ends of the filter 32 in the axial direction are welded, or when a quantity of hydrogen which bypasses the filter 32 is within a tolerance range, the length A (see FIG. 5) of the insert portion 40 in the axial direction may be, for example, about the same length as the length B (see FIG. 5) of the filter 32 in the axial direction before assembly, without being shorter than the length B.

Further, the subassembly which is provided with the valve element 52 and the valve seat 54 therein may not be provided with the filter 32. Also in such a case, the similar effects of the sealing of the casing flow path 60 by the sealing portion formed in the outer surface of the valve housing, and the positioning of the valve housing in the radial direction perpendicular to the axial direction with respect to the casing 20, can be acquired.

Although the casing 20 is comprised of the first casing member 22 and the second casing member 23 which, are disposed adjacent to each other in the axial direction in the embodiment, the casing 20 may be comprised of three or more casing members. In such a case, the similar effects to those of the embodiment can be acquired by, for example, forming the recessed portion 28 between two of the three or more casing members which are located adjacent to each other in the axial direction, forming the protruded portion 34 in the outer surface of the valve housing, and pinching the protruded portion 34 in the recessed portion 28 when assembling the two adjacent casing members.

Although the valve element 52 is made of a resin or rubber, and the valve seat 54 is formed by the inner surface of the metal valve housing in the embodiment, different structures may also be adopted. For example, the valve element 52 may be made of metal, and a sheet made of a resin or rubber may be disposed on the valve seat 54 side.

Modification 3 (Modification of Receptacle Structure)

Although the attachment of the check valve 10 to the flange 17 is achieved by the threaded-engagement fastening in the embodiment (fastening portion X in FIGS. 1 and 2) different structures may also be adopted. For example, the check valve 10 and the flange 17 may be fixed to each other by using a snap ring, etc.

Although the flange 17 is used as the interposition member which is placed between the check valve 10 and the vehicle body (vehicle body 15) in the embodiment, different structures may also be adopted. For example, the casing 20 and the vehicle body 15 may be directly fastened to each other by using bolts and nuts as the interposition member. Also in such a case, when the interposition member is made of metal which is lower in the ionization tendency than the casing, similar effects of preventing the corrosion of the casing and improving the durability of the check valve 10 can be acquired.

In the embodiment, although the check valve 10 is attached to the vehicle body 15 of the fuel cell vehicle, different structures may also be adopted. For example, the check valve 10 may also be applied to movable bodies other than the vehicles, and may also be applied to various kinds of devices which are provided with a hydrogen tank therein. Also in such cases, a similar check valve 10 and a similar receptacle structure 100 can be provided to a filling port provided to a case of these movable bodies and devices. Further, a similar check valve or a similar receptacle structure to the embodiment may also be applied to a flow path through which fluid other than hydrogen, for example, a compressed natural gas (CNG) flows.

The invention is not limited to any of the embodiment, the examples and the modifications described above but may be implemented by a diversity of other configurations without departing from the scope of the invention. For example, the technical features of any of the embodiment, examples and modifications corresponding to the technical features of each of the aspects described in SUMMARY may be replaced or combined appropriately, in order to solve part or all of the problems described above or in order to achieve part or all of the advantageous effects described above. Any of the technical features may be omitted appropriately unless the technical feature is described as essential herein.

What is claimed is:

1. A check valve configured to be disposed in piping of a fluid, comprising:
   a valve housing that is configured to place a valve element and a valve seat therein; and
   a casing that is configured to place the valve housing therein and is formed separately from the valve housing, wherein a casing flow path is provided between the casing and the valve housing to make a flow of the fluid in an axial direction of the valve housing,
   wherein the check valve is set to a closed position when the valve element comes into contact with the valve seat and is set to an open position when the valve element separates from the valve seat, and
   the valve housing comprises
      a communicating hole that is formed through the valve housing in a thickness direction thereof to introduce the fluid flowing through between the valve element and the valve seat at the open position of the check valve, into the casing flow path; and
      a sealing portion that is provided on an outer surface of the valve housing upstream of the communicating hole in a flow direction of the fluid in the casing flow path, the sealing portion being configured to come into contact with an inner surface of the casing to seal the casing flow path and position the valve housing in a radial direction perpendicular to the axial direction relative to the casing, wherein
   the casing includes a plurality of casing members that are integrated by fitting the casing members relative to each other in the axial direction,
   the sealing portion is a protruded portion formed as a larger-diameter protrusion of the valve housing by expanding a diameter of a cross section perpendicular to the axial direction,
   the protruded portion has a pair of tapered portions that are formed at both ends thereof in the axial direction, each of the tapered portions being tapered to have a diameter decreasing in the axial direction toward a corresponding end of the protruded portion, the protruded portion is placed between two adjacent casing members, such that each of the pair of tapered portions comes into contact with a different one of the two casing members and an end of each of the pair of tapered portions in the radial direction is spaced apart in the axial direction from an immediately adjacent end of a respective one of the casing members, so as to position the valve housing in the casing in the axial direction, and the check valve further comprises a filter that is configured to remove unrequired substance from the fluid flowing into the valve housing;

a filter guide that is configured to have a filter mounting part to which the filter is attached and to be joined with the valve housing, such that the fluid passing through the filter is led to the valve housing; and a filter supporting portion that is configured to support respective ends of the filter at both ends of the filter mounting part, wherein a length of the filter in an inserting direction before being supported at the respective ends on the filter mounting part is longer than a length of the filter mounting part in the inserting direction, the filter supporting portion has a larger diameter in a transverse section than the filter mounting part, and the filter is held by the filter supporting portion and is compressed in the inserting direction.

2. The check valve in accordance with claim 1, wherein the casing and the valve housing are made of metal.

3. The check valve in accordance with claim 1, further comprising a valve holder that is attached to the valve housing, wherein the valve element and a spring that is arranged to press the valve element in a closing direction are placed in a space formed by the valve holder and the valve housing.

4. A receptacle structure mounted to a housing of a device that includes a hydrogen tank placed therein, the receptacle structure having a filling port that forms an end structure of a flow path communicating with the hydrogen tank and being connected with a hydrogen discharging part of a hydrogen supply device to fill hydrogen into the hydrogen tank, the receptacle structure comprising:

the check valve in accordance with claim 1; and an interposition member that is placed between the check valve and the housing of the device, wherein the casing of the check valve is made of austenite stainless steel, and the interposition member is made of a less noble metal than the austenite stainless steel.

* * * * *